Sept. 25, 1934.　　　　J. W. FAY　　　　1,974,706
ANIMAL TRAP
Filed Jan. 11, 1934
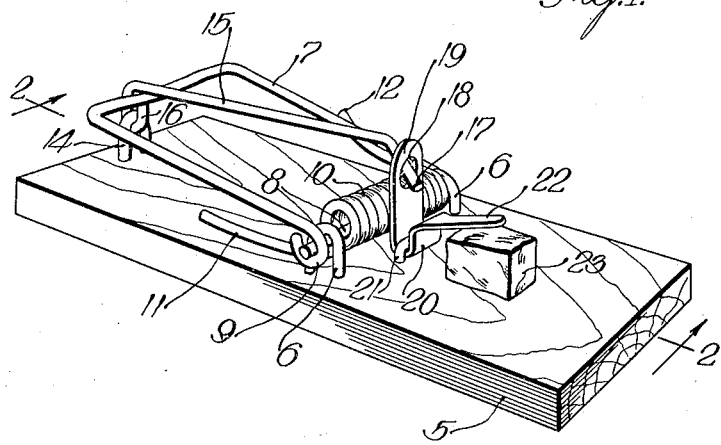
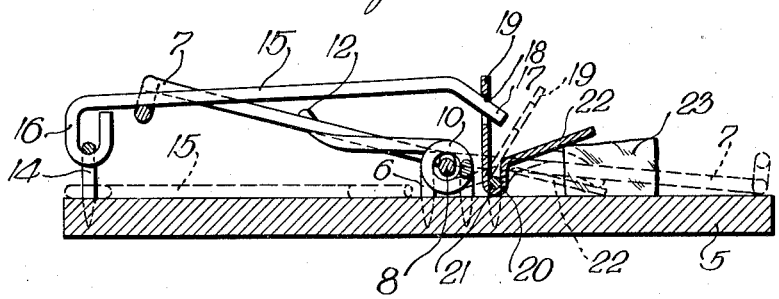
Inventor:
Joseph W. Fay
By Mawr Jackson Bouvier Deiner
Att'ys.

Patented Sept. 25, 1934

1,974,706

UNITED STATES PATENT OFFICE 1,974,706

ANIMAL TRAP

Joseph W. Fay, Chicago, Ill., assignor of one-half to Ersyl F. Chambless, Chicago, Ill.

Application January 11, 1934, Serial No. 706,190

3 Claims. (Cl. 43—81)

This invention relates to animal traps, and more particularly to traps for mice, rats, and similar rodents.

Prior traps of this type have been subject to several objections. In the first place, they have always been rather difficult to set, and present always the danger of being accidentally released while being set and thus causing injury to the person attempting to set the same. Also, for a device of this type, economy of manufacture must be considered, and traps of the positive acting type of the prior art have been relatively expensive to manufacture. Further, certain types of traps as heretofore known are so designed that the bait is disposed on the upper surface of the trigger or bait arm, and can be removed without springing the trap, which renders the trap not positive in operation.

The primary object of the present invention is to provide a trap of the type wherein the bait is so disposed that removal or displacement thereof will positively spring the trap. This is accomplished by placing the bait under the bait arm and maintaining the trap set by the spring pressure bearing down through the bait arm upon the bait. As soon as the bait is dislodged or removed, the bait arm drops down and releases the trigger arm, springing the trap.

Another object of the present invention is to produce a trap that is economical in manufacture, with relatively few parts, and which may be easily set without danger of injury.

A still further object of the present invention is to provide a trap having a bait arm which extends outwardly at an angle to the trap base, to form a wedge-like receiving space for the bait, whereby its displacement or removal is facilitated.

Other objects and advantages of the present invention will appear more fully from the following detailed description, which, taken in connection with the accompanying drawing, will disclose to those skilled in the art the particular construction and operation of a preferred form of the invention.

In the drawing:

Figure 1 is a perspective view of the trap of the present invention set in operative position; and Figure 2 is a cross sectional view, taken on the line 2—2 of Figure 1, showing in detail the construction of the trap, and also showing in dotted line position the trap after it has been sprung.

Referring now in detail to the drawing, the trap base, which is the ordinary type of small rectangular wooden block member, is indicated at 5. Mounted upon the base 5 are a pair of spaced staple members indicated at 6, which are driven into the upper surface of the base, and which serve as pivot supports for the spring bail member or striking bar. This member is of unitary construction, and comprises the bail portion 7, and the integral shaft or rocking portion indicated at 8, which shaft portion extends through the openings in the staples 6, and serves as a pivotal rocking shaft for the bail portion 7 thereof. It should be noted that one end of the bail portion, indicated at 9, is looped about the extending end of the shaft portion 8, and thus serves to define a substantially rectangular bail member of unitary construction which has one portion thereof serving as a pivot about which the member rotates.

Coiled about the shaft portion 8 of the bail member or striking bar is a spring member indicated at 10, which spring member has an end 11 thereof bearing against the upper surface of the base 5, and has the opposite end 12 thereof engaging the rear of the striking bar 7 for the purpose of urging it forwardly into the position shown in dotted lines in Figure 2.

Mounted substantially centrally of the base 5, and at the rear end thereof, is a third staple member, indicated at 14, which corresponds to the staple members 6, and which serves as a support for the trigger arm 15. The trigger arm 15 is formed of spring wire or the like and has one end thereof, indicated at 16, looped about the U-shaped portion of the staple member 14, and the opposite end 17 thereof bent downwardly at an angle to engage in the opening 18 formed in the trigger portion 19 of the bait arm.

The bait arm is pivoted about a staple member 21 driven into the upper surface of the base 5, and comprises an integral stamped metal member which has the lower portion 20 thereof looped to engage under staple 21, and has the upstanding trigger portion 19 and the substantially laterally and angularly extending portion 22.

The portion 22, as shown in Figure 2, extends substantially outwardly at an angle with respect to the plane of the base 5, to form a wedge-shaped receiving space for the bait 23. It will thus be apparent that the under surface of arm 22 has substantially line contact with the bait 23.

In setting the trap, the bail member 7 is first moved, against the pressure of spring 10, to the position shown in Figure 1, and the trigger arm 15 is engaged over the outwardly extending transverse portion thereof, and has its free end 17 inserted into the opening 18 of the trigger arm 19. The bait 23 is then inserted under the bait arm 22, and the pressure of the bail 7, due to the spring 10, bears against the trigger arm 15 adjacent its pivot 14, and thus serves to transmit this pressure to the end 17 engaging in the opening 18, tending to rotate the trigger arm in a clockwise direction, as viewed in Figure 2. Due to the bait being placed under the bait arm 22, the trigger arm 15 tends to urge the bait arm 22 downwardly against the bait 23. Upon removal or dislodgment of the bait 23, therefore, the spring pressure effective upon the bail 7 serves to move the bait arm 22 downwardly, which moves the portion 19 forwardly into the position shown in dotted lines, thus releasing the trigger arm 15 and allowing the bail 7 to snap over into the position shown in dotted line, in order to catch the animal which is removing the bait.

Since the bait supports the bait arm in position, the danger of accidentally springing the trap while setting it or placing it in position is eliminated to a large extent, since the bait arm is positively held in position, and this consequently facilitates the setting and placing of the present type of trap. Further, it will be noted that the bail member 7 with its rock shaft 8, is formed of an integral spring wire member, and that the trigger 19 and bait arm 22 are formed from a single metal stamping. The entire structure thus requires only a limited number of parts, which are of simple and economical manufacture.

It will be noted, also, that at no time is there a direct thrust against the bearing 21 for the trigger 19, since the spring pressure is at all times exerting only a rotational force about this pivot member, and never a direct thrust either toward or away from the member. This eliminates strain upon the member, and adds to the life of the trap. Sensitivity of action is also provided by means of the tapered receiving chamber for the bait, due to the angularly extending arm 22, since only line contact between the bait and the arm is provided, which reduces the amount of effort required to overcome friction and remove the bait, and thus renders the trap more sensitive in operation.

Inasmuch as minor modifications and changes may be made in the structural features of the present invention, I do not intend to be limited to the embodiment shown herein except as defined by the scope and spirit of the appended claims.

I claim:

1. In a trap of the class described, a base, a pair of staple members disposed in transverse alinement on said base, an animal-engaging member comprising a bail portion having an integral pivot portion formed therewith, said pivot portion having engagement in said staple members, a spring member coiled about said pivot portion and normally tending to rotate said bail portion, a trigger member pivoted on said base forwardly of said spring member and having an upstanding portion provided with an opening, and a bait arm portion, said bait arm portion extending forwardly and upwardly with respect to said base, a trigger arm pivoted at the rear of said base and adapted to engage over said bail portion when said trap is set, and a downwardly inclined latch portion on said trigger arm engaging in the opening in said upstanding portion of said trigger member, said trigger member being supported in latch-retaining position by bait placed beneath the bait arm portion.

2. In a trap having a spring-actuated pivoted striking bar and a trigger arm for retaining said striking bar in set position, the combination of trigger means disposed for pivotal movement forwardly of the pivotal support for said striking bar and comprising an integral upstanding portion having an opening adjacent the upper end thereof and a bait arm portion extending forwardly and upwardly from the pivotal support for said means and adapted to be supported in raised position by bait placed beneath said portion, and a downwardly inclined latch portion at one end of said trigger arm engaging in said opening and restrained against disengagement therefrom only when the bait arm portion is supported by the bait.

3. In combination, a spring-actuated pivoted striking bar, a bait receiving member pivoted forwardly thereof and comprising a pair of angularly extending arm portions with an offset U-shaped pivot portion therebetween about which said arm portions rotate, one of said arm portions in normal position extending forwardly at an upward inclination and adapted to be supported in position by bait placed therebeneath, the other of said arm portions normally extending upwardly and having an opening therein at the upper end thereof, and a trigger arm restraining said striking bar in operative position and having a downwardly inclined latch portion extending angularly through said opening and bearing against the upper edge thereof, said latch portion being released upon rotation of said upstanding arm portion due to removal of the bait from beneath said bait-supported arm portion.

JOSEPH W. FAY.